(12) United States Patent
Bensinger

(10) Patent No.: US 9,471,442 B2
(45) Date of Patent: *Oct. 18, 2016

(54) DATA TRANSFER AND RECOVERY

(71) Applicant: DSSDR, LLC, Windermere, FL (US)

(72) Inventor: Andrew Bensinger, Windermere, FL (US)

(73) Assignee: DSSDR, LLC, Windermere, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/666,426

(22) Filed: Mar. 24, 2015

(65) Prior Publication Data

US 2015/0193313 A1 Jul. 9, 2015

Related U.S. Application Data

(63) Continuation of application No. 13/798,904, filed on Mar. 13, 2013, now Pat. No. 9,015,520, which is a continuation-in-part of application No. 13/461,082, filed on May 1, 2012, now Pat. No. 8,639,966, which is a continuation of application No. 13/026,441, filed on Feb. 14, 2011, now Pat. No. 8,176,358, which is a continuation of application No. 12/364,461, filed on Feb. 2, 2009, now Pat. No. 8,001,414, which is a continuation of application No. 11/769,544, filed on Jun. 27, 2007, now Pat. No. 7,487,383.

(60) Provisional application No. 60/817,211, filed on Jun. 29, 2006.

(51) Int. Cl.
*G06F 11/14* (2006.01)
*G06F 11/16* (2006.01)
*G06F 11/20* (2006.01)

(52) U.S. Cl.
CPC ....... *G06F 11/1464* (2013.01); *G06F 11/1451* (2013.01); *G06F 11/1469* (2013.01); *G06F 11/1662* (2013.01); *G06F 11/203* (2013.01); *G06F 11/1484* (2013.01); *G06F 11/2028* (2013.01); *G06F 11/2094* (2013.01)

(58) Field of Classification Search
CPC .......... G06F 11/1451; G06F 11/1469; G06F 11/1412; G06F 11/1484; G06F 11/203; G06F 11/2028; G06F 11/2094; G06F 11/1464

See application file for complete search history.

(56) References Cited

U.S. PATENT DOCUMENTS

| | | |
|---|---|---|
| 5,089,958 A | 2/1992 | Horton et al. |
| 5,537,533 A | 7/1996 | Staheli et al. |
| 5,737,514 A | 4/1998 | Stiffler |
| 5,774,660 A | 6/1998 | Brendel et al. |
| 5,781,703 A | 7/1998 | Desai et al. |
| 5,799,147 A | 8/1998 | Shannon |
| 5,852,713 A | 12/1998 | Shannon |
| 5,852,724 A | 12/1998 | Glenn, II et al. |
| 5,917,997 A | 6/1999 | Bell et al. |
| 5,987,621 A | 11/1999 | Duso et al. |

(Continued)

*Primary Examiner* — Nadeem Iqbal
(74) *Attorney, Agent, or Firm* — Morris & Kamlay LLP

(57) ABSTRACT

A backup image generator can create a primary image and periodic delta images of all or part of a primary server. The images can be sent to a network attached storage device and one or more remote storage servers. In the event of a failure of the primary server, an updated primary image may be used to provide an up-to-date version of the primary system at a backup or other system. As a result, the primary data storage may be timely backed-up, recovered and restored with the possibility of providing server and business continuity in the event of a failure.

6 Claims, 9 Drawing Sheets

(56) References Cited

U.S. PATENT DOCUMENTS

| | | |
|---|---|---|
| 6,078,957 A | 6/2000 | Adelman et al. |
| 6,119,244 A | 9/2000 | Schoenthal et al. |
| 6,144,999 A | 11/2000 | Khalidi et al. |
| 6,145,094 A | 11/2000 | Shirriff et al. |
| 6,148,383 A | 11/2000 | Micka et al. |
| 6,163,856 A | 12/2000 | Dion et al. |
| 6,247,139 B1 | 6/2001 | Walker et al. |
| 6,269,431 B1 | 7/2001 | Dunham |
| 6,292,905 B1 | 9/2001 | Wallach et al. |
| 6,304,980 B1 | 10/2001 | Beardsley et al. |
| 6,324,161 B1 | 11/2001 | Kirch |
| 6,360,306 B1 | 3/2002 | Bergsten |
| 6,609,213 B1 | 8/2003 | Nguyen et al. |
| 6,691,245 B1 | 2/2004 | DeKoning |
| 6,694,447 B1 | 2/2004 | Leach et al. |
| 6,785,786 B1 | 8/2004 | Gold et al. |
| 6,859,834 B1 | 2/2005 | Arora et al. |
| 6,883,010 B2 | 4/2005 | Byrne |
| 6,944,785 B2 | 9/2005 | Gadir et al. |
| 6,944,788 B2 | 9/2005 | Dinker et al. |
| 6,948,089 B2 | 9/2005 | Fujibayashi |
| 6,986,076 B1 | 1/2006 | Smith et al. |
| 7,043,665 B2 | 5/2006 | Kern et al. |
| 7,076,620 B2 | 7/2006 | Takeda et al. |
| 7,107,418 B2 | 9/2006 | Ohran |
| 7,107,483 B2 | 9/2006 | Duncan et al. |
| 7,124,267 B2 | 10/2006 | Morishita et al. |
| 7,143,307 B1 | 11/2006 | Witte et al. |
| 7,284,150 B2 | 10/2007 | Ma et al. |
| 7,318,133 B2 | 1/2008 | Yagawa et al. |
| 7,353,335 B2 | 4/2008 | Kawamura |
| 7,487,383 B2 * | 2/2009 | Bensinger ........... G06F 11/1456 714/4.11 |
| 7,565,501 B2 | 7/2009 | Mogi et al. |
| 7,610,362 B2 | 10/2009 | Takamoto et al. |
| 7,634,626 B2 | 12/2009 | Arakawa et al. |
| 7,644,244 B2 | 1/2010 | Homma et al. |
| 7,644,249 B2 | 1/2010 | Keeton et al. |
| 7,756,833 B2 | 7/2010 | Van Ingen et al. |
| 7,788,521 B1 | 8/2010 | Sim-Tang |
| 8,001,414 B2 * | 8/2011 | Bensinger ........... G06F 11/1456 714/4.1 |
| 8,166,476 B2 | 4/2012 | Tolman et al. |
| 8,176,358 B2 * | 5/2012 | Bensinger ........... G06F 11/1456 714/4.1 |
| 8,639,966 B2 * | 1/2014 | Bensinger ........... G06F 11/1456 714/4.11 |
| 9,015,520 B2 * | 4/2015 | Bensinger ........... G06F 11/1451 714/4.11 |
| 2002/0049778 A1 | 4/2002 | Bell et al. |
| 2002/0099916 A1 | 7/2002 | Ohran et al. |
| 2003/0074600 A1 | 4/2003 | Tamatsu |
| 2003/0120772 A1 | 6/2003 | Husain et al. |
| 2004/0172574 A1 | 9/2004 | Wing et al. |
| 2005/0177777 A1 | 8/2005 | Seaburg et al. |
| 2005/0240740 A1 | 10/2005 | Takeda et al. |
| 2005/0240813 A1 | 10/2005 | Okada et al. |
| 2005/0251633 A1 | 11/2005 | Micka et al. |
| 2005/0273654 A1 | 12/2005 | Chen et al. |
| 2006/0218365 A1 | 9/2006 | Osaki et al. |
| 2010/0005337 A1 | 1/2010 | Bensinger |
| 2011/0214013 A1 | 9/2011 | Bensinger |

* cited by examiner

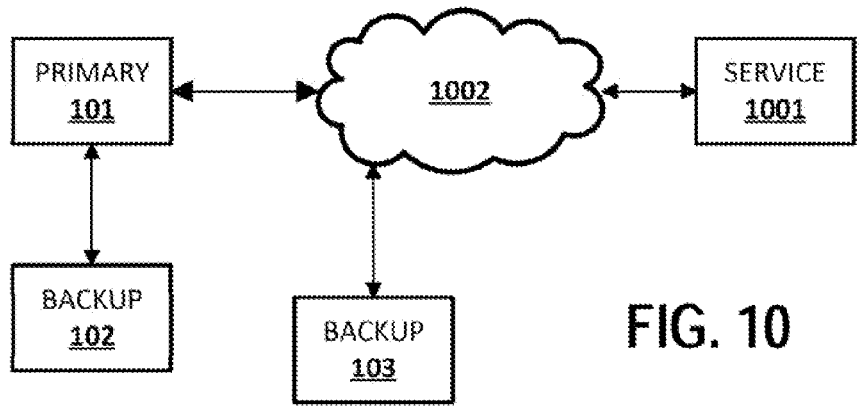
FIG. 10
FIG. 11
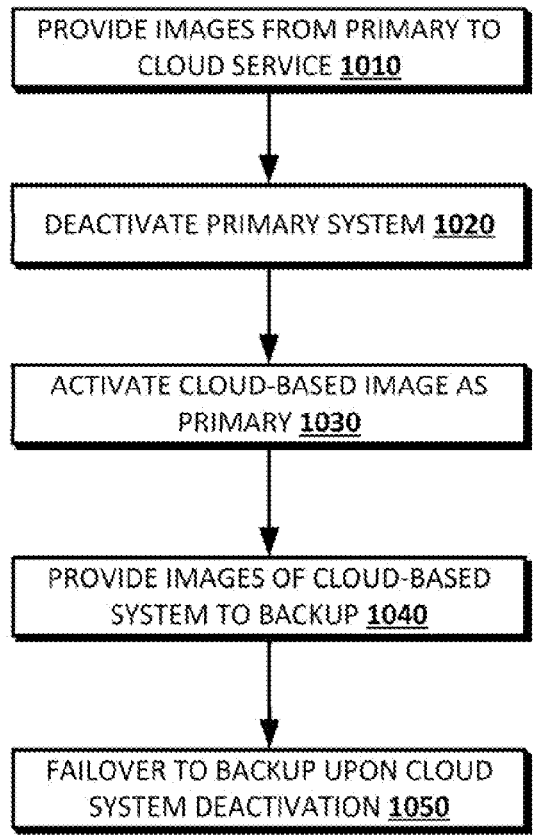

ized by using various systems ranging from simple periodic tape drive or disk backups to sophisticated, redundant, mirror systems running the operating systems and applications present on the primary systems. Data changes to the primary system can be frequently transmitted to the one or more secondary sites to keep them updated. In the event of a malfunction or loss of a primary site, users are redirected to a fully functional and updated secondary site. It can be expensive to maintain such functioning and synchronized backup sites. Software licenses for operating systems and applications running on the primary site have to be purchased and maintained for the backup site. The backup site has to be operated and maintained by a support staff. Malfunction and loss of computer systems can be especially problematic for smaller businesses, which may not have the budget to maintain fully operational, synchronized backup systems. This can be due to prohibitively expensive redundant hardware, operating system and application licenses and the cost of staffing backup operations. Small businesses have been forced to rely on less effective and efficient backup methods, such as tape backup systems or basic remote data storage resources. Such backups can be insufficient and unreliable and can lead to the loss of data and the interruption of business services. Data updates can be infrequent or unreliable and differences between primary and backup hardware and software (e.g., operating system versions, applications, device drivers, etc.) can mean that the backup may not work at the worst possible time, i.e., when it is needed.

DATA TRANSFER AND RECOVERY

CROSS-REFERENCE TO RELATED APPLICATIONS

This application is a continuation of U.S. application Ser. No. 13/798,904, filed Mar. 13, 2013, which is a continuation-in-part of U.S. application Ser. No. 13/461,082, filed May 1, 2012, now U.S. Pat. No. 8,639,966, which is a continuation of U.S. application Ser. No. 13/026,441, filed Feb. 14, 2011, now U.S. Pat. No. 8,176,358, which is a continuation of U.S. application Ser. No. 12/364,461, filed Feb. 2, 2009, now U.S. Pat. No. 8,001,414, which is a continuation of U.S. application Ser. No. 11/769,544, filed Jun. 27, 2007, now U.S. Pat. No. 7,487,383, which claims the benefit of U.S. Provisional Patent Application 60/817,211, filed on Jun. 19, 2006, each of which is hereby incorporated by reference in its entirety.

BACKGROUND

Business interruption due to the malfunction or loss of a server at a primary site can be a major problem for large as well as small businesses. Known systems address this issue Accordingly, what is needed is a cost-effective data backup and recovery system that can provide near-real time data backup and recovery for minimization of business interruption resulting from data system failure without the high costs of a live, redundant, mirror backup system.

BRIEF DESCRIPTION OF THE DRAWINGS

The accompanying drawings illustrate the present invention and, together with the description, further serve to explain the principles of the invention and to enable one skilled in the pertinent art to make and use the invention.

FIG. 10 shows an example arrangement for transitioning a primary system to a remote backup service according to an embodiment of the invention.

FIG. 11 shows an example process for transitioning a primary system to a remote backup service according to an embodiment of the invention.

DETAILED DESCRIPTION

Figure 1:
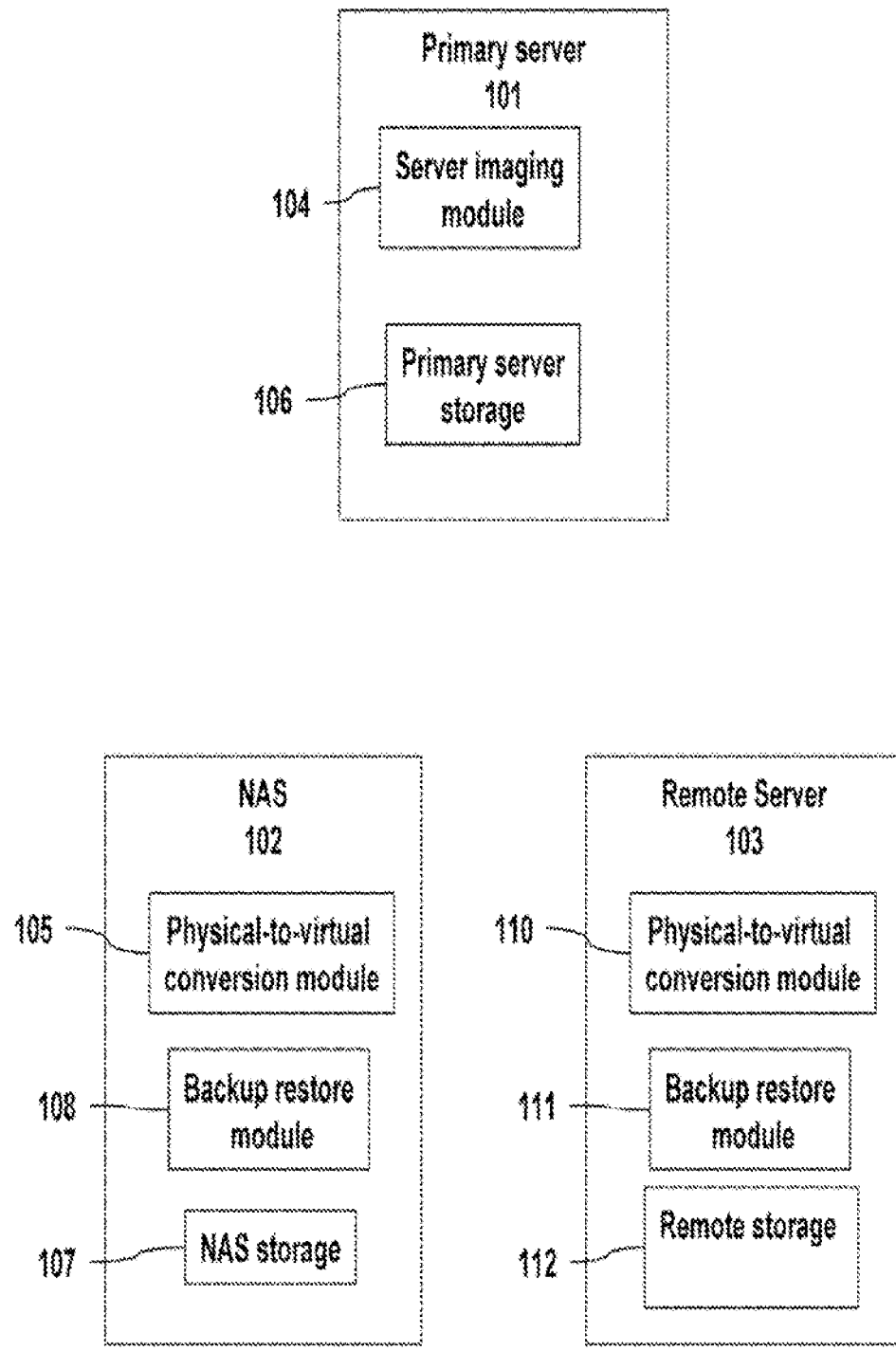
FIG. 1 illustrates a data recovery system according to an embodiment of the present invention.

Embodiments of the present invention can provide a system that can store and regularly update a backup disk image of a primary computer system, including the operating system, applications and data. The disk image can be stored on any suitable device adapted to store digital information, according to the needs of a client. For example, to recover from a failure of a partition, the image can be stored on another partition of the same drive used by the primary system. Alternatively, the image can be stored on an external drive coupled (e.g., via USB) to the primary system. To provide continuity of operations across the loss of the primary site (e.g., due to fire, acts of war, etc.), the image can be stored on a remote system, e.g., thousands of miles away from the primary system.

Backup software on the primary system can cause the primary system to track changes to the primary disk image and send updates (which can be sent periodically, aperiodically or in response to a triggering condition or event) to the backup system. Software at the backup system can update the backup primary image based upon the contents of the updates. In the event of a failure of the primary system, the up-to-date backup image can be loaded onto another system, which when running can essentially duplicate a recent state of the primary system before failure. In one embodiment, the backup primary image and delta images can be used to activate a remote virtual server to which users can be redirected after failure of the primary site. In another embodiment, the primary system can be restored after power is restored or the primary system is repaired. This can be done by loading the backup image onto the repaired primary system and activating it.

At least one of the primary and backup data storage system control modules can coordinate the copying of primary data images to the secondary data storage system, where the secondary data storage system is preferably a backup appliance such as a Network Attached Storage device ("NAS"). As used herein, "storage" can include all or part of a hard disk, RAM, ROM, flash memory, an external drive and any other device adapted to store electronic information. "Primary server storage," "network attached storage device," etc. can include any all or part of any such device that is usable by the primary server, network storage device, etc., respectively. Information may be transferred between the primary and backup data storage system controllers synchronously, when a primary host computer requests writing of data to a primary data storage device, or asynchronously with the primary host computer requesting the writing of data to the primary data storage system, in which case the remote data copying or mirroring is independent of and largely transparent to the primary computer system. Data may also be similarly transferred between the primary or NAS and a remote storage server, thus providing an additional layer of failure protection.

The data in the backup image can include a disk or partition image from the primary server system. The initial image may be a complete compressed block level copy of the primary server's hard drive patterns and can include a boot level backup feature. Once the initial image is transferred, incremental or differential changes can subsequently be composed and sent to the backup device or storage unit. These updates may utilize bandwidth limiting and throttling such that primary server functionality is largely unaffected by the backup work. For example, the updates can be sent as a second or lower priority to functions performed by the primary system. For example, an update transmission can be held while a user at the primary system views a streamed video that requires substantial bandwidth to properly display. The update transmission rate can be slowed while the video is being streamed to prevent interruptions in the viewed video, and then increased when the video is finished and the bandwidth becomes available. The timing of the updates can be controlled by a user or administrator of the primary system.

FIG. 1 illustrates a recovery system according to an embodiment of the present invention. The recovery system includes a primary server 101 coupled to a NAS 102 and a remote server 103. NAS 102 may be coupled to primary server 101 in any suitable way, e.g., direct connection via USB or connected through a network, such as a LAN, WAN, the Internet, etc. Remote server 103 may be connected to NAS 102 and primary server 101 in any suitable was, e.g., through a network such as a LAN, WAN, the Internet, etc. Primary server 101 can include server imaging module 104 and server imaging module 104. Server imaging module 104 can send disk images to NAS 102 and Remote Storage Server 103. Primary server storage can be any device adapted to store digital information, including RAM, ROM, a hard disk, flash memory, etc. Primary server storage 106 can include a hard disk that stores an operating system for primary server 101, as well as application software and data. Primary server storage can be distributed across several devices. For example, the operating system can be stored on a hard disk, while an application can be stored on a CD ROM and certain data can be stored on flash memory. Server imaging module 104 can be stored in primary server storage 106, which can include an adjunct memory device, e.g., a smart card, flash memory, an external hard drive, etc., and can create disk images or partition images and continuous or near continuous incremental or differential images of changes occurring on the primary server storage 106. The initial disk or partition image may be referred to as a primary disk image. The continuous or near continuous incremental or differential images may be referred to as delta images. The primary server 101 can be a customer server or workstation.

Primary server imaging module 104 can compose and send the initial disk image to NAS storage 107 and remote storage 112 or the image can be sent to NAS storage 107 and then passed from NAS to remote storage 112. NAS data storage 107 can be any suitable device adapted to store digital information. Remote data storage 112 can be any suitable device adapted to store digital information. Deltas for the image can be sent from the primary server 101 or the NAS 102 to the remote server.

Server imaging module 104 can also detect differences in primary server storage 106 since the initial disk image was composed and sent to NAS storage 107 and remote storage 112. Server imaging module 104 can package such differences into an update message, which it can send to NAS storage 107 and remote storage 112. Deltas may also be sent to NAS storage 107 and NAS 102 can send the deltas to remote storage 112. Backup restore modules 108 and I11 can update the image of primary server memory 106 that is stored in NAS storage 107 or remote storage 112 by applying an update based upon the update message. Server imaging module 104 can compose and send additional update messages, where each update message can be based upon the differences in primary server storage 106 since the last update was composed and sent. Backup restore module 108 or I11 can apply one or more updates sequentially to create an updated backup image in NAS storage 107 or remote storage 112 of primary server storage 106.

Figure 2:
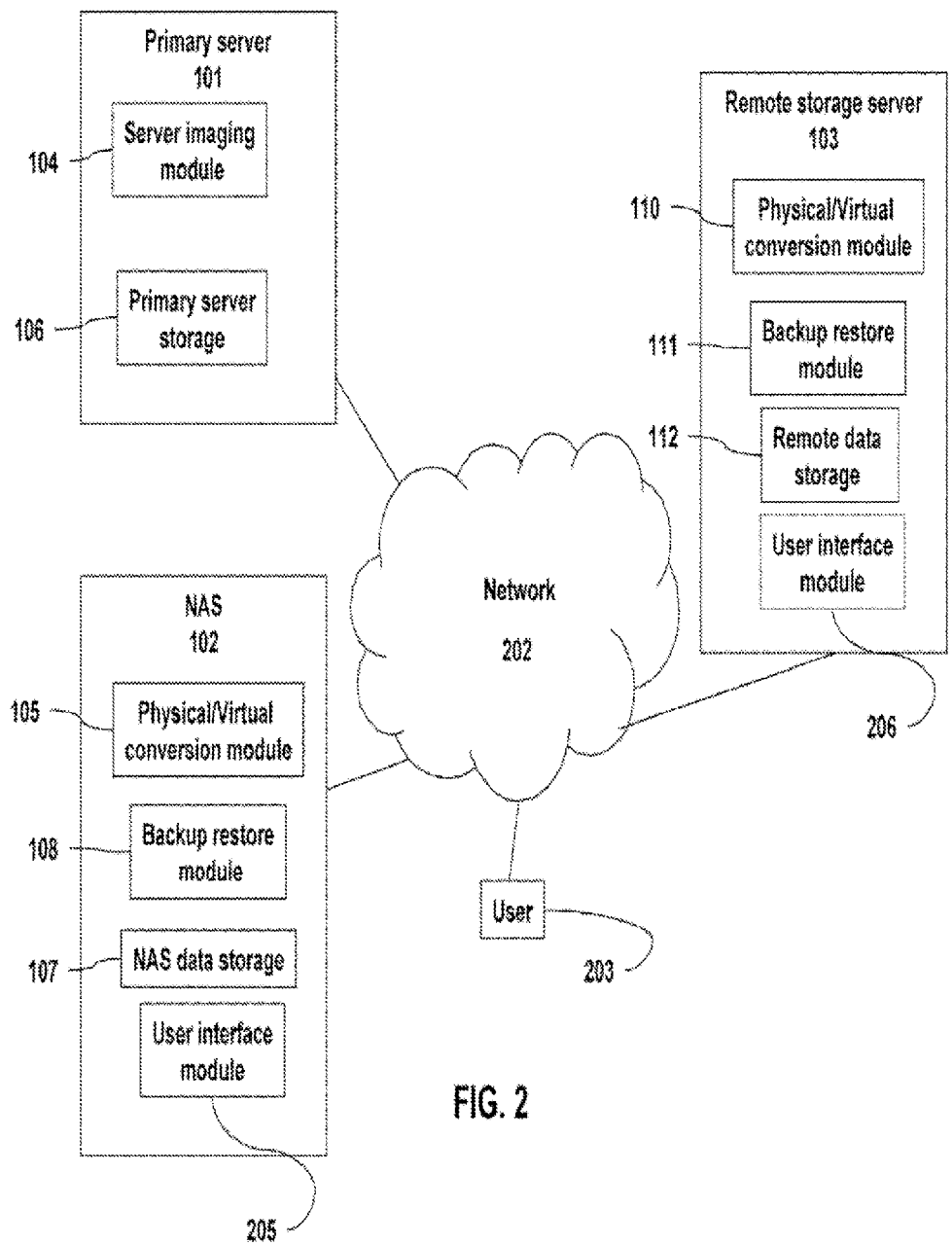
FIG. 2 illustrates a data recovery system according to an alternative embodiment of the present invention.

As shown in FIG. 2, the primary and delta images may be sent to a NAS 102 and remote backup server 103 across network 202, e.g., across the Internet or any other suitable network or combination of networks. Transmission may be accomplished through the use of secure transport software such as a synchronization/augmentation server or programs and protocols such as HTTPS, Secure FTP, PIPS 140-2 validated or any other secure transmission method. The image capture, data back-up process, and incremental updates may run within the operating system level of the physical or virtual machine designated as the primary server with the incremental updates able to be combined into daily updates to minimize data storage requirements and in effect creating an "incremental forever" image of the primary server system. For example, incremental updates of a primary image that are composed and sent every fifteen minutes can be processed and combined into a single update at the end of every 24 hours. The fifteen minute incremental updates can also be stored (e.g., archived) as individual files. The daily update can reflect the net changes to the image that would be equivalent to applying each of the fifteen minute updates in order. At the end of every week, the seven daily updates can be processed and combined into a single week update that similarly reflects the net changes to the image that would be equivalent to applying each of the seven daily updates in order. Similar operations can be undertaken to produce a monthly, quarterly and annual update file that reflects and would be equivalent to the net changes to the image based upon the underlying, more frequent updates. Quarter hour, daily, weekly, quarterly, annual, etc. updates can be archived so that an image can be modified to reflect its state at any of the times available through any of the updates. For example, if an image taken on Jan. 1, 2006 is to be restored to its state on Sep. 24, 2006 at 0045 hours, three quarterly updates can be applied in sequence (updates dated Mar. 1, Jun. 1 and Sep. 1, 2006), then three weekly updates may be applied in sequence (September 7, September 14) and then three fifteen minute updates may be applied (0015, 0030 and 0045). An embodiment of the present invention thus provides a way to create an image based upon a primary image and updates (deltas) at any time for which updates are available. The remote server 103 can have a physical one-to-one ratio with the primary server 101, or can accommodate a plurality of autonomous virtual backup servers, each serving as a fail over for its respective primary data storage server. The ability to have a plurality of virtual servers in one data recovery storage device can dramatically reduce costs for small business customers.

Upon failure of the primary server 101, a user 203 can send a failure notification to backup server 103 or NAS 102. Alternatively, the primary server 101 or a third party (e.g., that performs a service monitoring function) can send the failure notification. Upon receiving the notification, the backup restore modules 108 or 111 can apply outstanding delta images to the primary image stored in NAS data storage 107 or remote data storage 112, respectively, thereby creating a reasonably up-to-date image of the primary server 106. In an embodiment, physical/virtual conversion module 105 or 110 can perform a physical-to-virtual ("P2V") conversion to create a virtual server, using the image in NAS storage 107 or remote storage 112. Likewise, physical/virtual conversion module 105 or 110 can perform a virtual-to-physical ("V2P") conversion to create a physical server from a virtual server. For example, a primary server may be lost due to a disaster or major malfunction, in which case a virtual image is updated, activated and maintained, e.g., updated and itself backed up in accordance with an embodiment of the present invention by storing its image and generating deltas. The virtual image may then be later restored to a different and/or dissimilar (to the failed primary server) hardware and software device by the physical/virtual conversion module 105 or 110 (e.g., a so-called "bare-metal" restore.) In accordance with an embodiment of the present invention, a primary server restoration request can be received to restore a server to a previous state. Physical/virtual conversion module 105 or 110 can perform a virtual to physical conversion of the virtual server on a backup device to create a restoration image. For example, the NAS 102 and/or the remote server 103 can create a restoration image for the primary server. Physical/virtual conversion module 105 or 110 can then perform then restoration of the primary server using the restoration image. Any suitable device (including primary server 101) can be used as the target of a restore operation.

User interface 205 or 206 can be activated and user 203 can be redirected from primary server 101 to NAS 102 or remote server 103. The virtual server can perform the functions of failed primary server 101 until proper repairs or replacements can be made at the primary site, at which time the information may be restored back to the primary server 101. The functions performed by the virtual server may include, for example, generating backup images and/or delta images of the virtual server during operation. The backup of the virtual server can later be used to create a failover for the virtual server, or to restore the primary server to a new, updated state based upon operations performed at the virtual server while operating in the primary server's stead. The operation of the virtual server or other backup system in generating such backup images is described in further detail below. In another embodiment, the backup image may be sent to primary server 101 and restored to primary server storage 106 when primary server 101 recovers, is repaired or replaced, and user can be switched back to primary server 101. The backup image also may be updated based upon operations performed at the remote server during the time the primary server remains unavailable. In another embodiment, the image may be loaded onto a new server or a NAS, which can then be sent to the location of the failed primary server 101 for replacement.

In accordance with an embodiment of the present invention, only one version of an image is actively used at any one time. This can eliminate the need for multiple software licenses.

Figure 3:
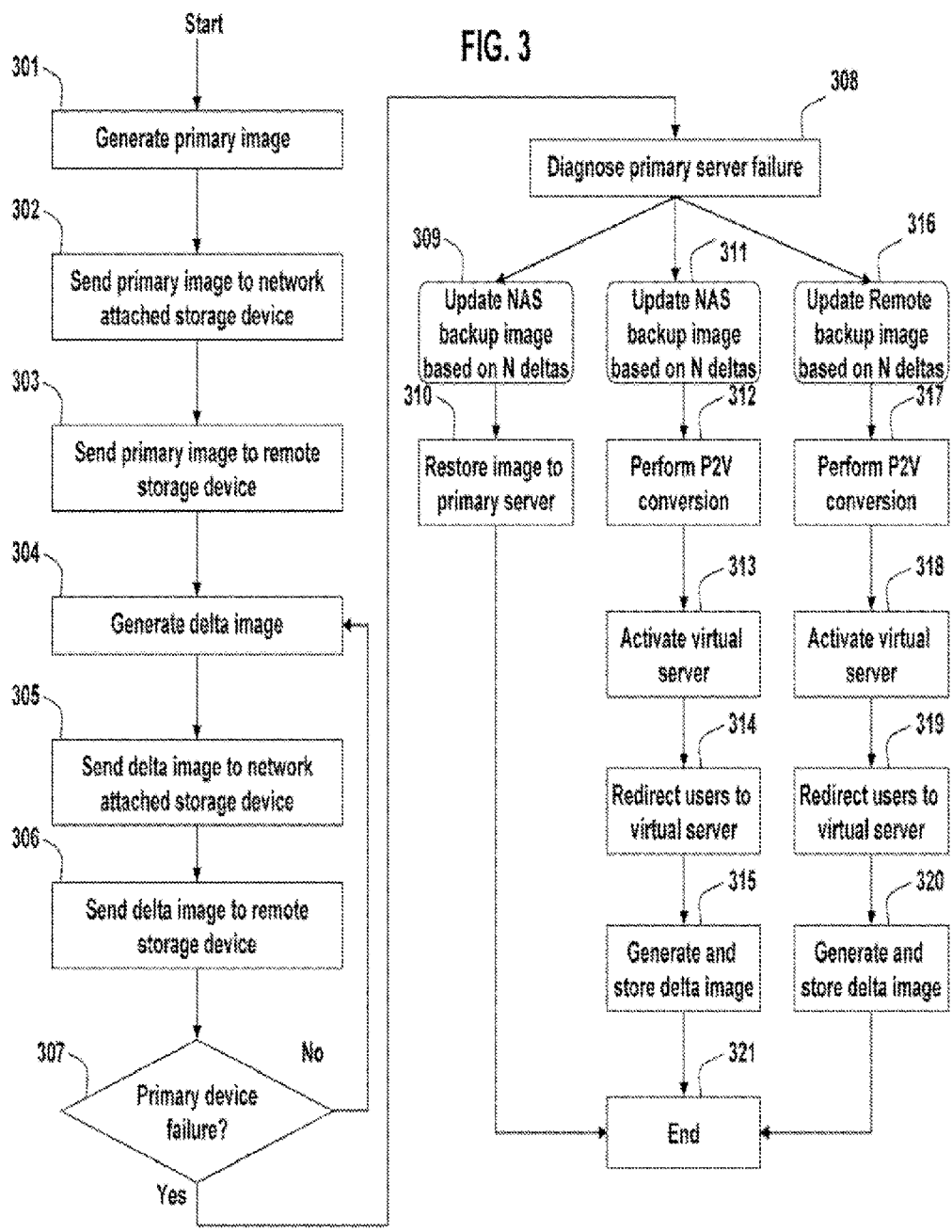
FIG. 3 is a flowchart which illustrates a method of data recovery according to an embodiment of the present invention.

FIG. 3 shows a flowchart illustrating a data recovery method according to an embodiment of the present invention where backup images can be stored both at a NAS and a remote storage device. A primary image can be created at step 301. The primary image can be sent to a NAS at step 302 and a remote storage device at step 303. A delta image can be created at step 304 representing incremental changes in the primary data server. The delta image can be sent to a NAS at step 305 and a remote storage device at step 306. At step 307 a notice of failure of the primary data server can be sent in the event of a failure of the primary data server. If a notice of failure is not sent, the system can return to step 304 and can repeat steps 304 through 306. If a notice of failure is sent, the system can continue to step 308 and the primary server failure can be diagnosed. Depending on the results of the diagnosis, the method may proceed to step 309, 311, or 316. If the diagnosis indicates that the failure is one that may be recovered from the NAS and the NAS is intact, the NAS backup image may be updated at step 309. In an embodiment (not shown), the updated image on the NAS may be converted to a virtual server and activated. Users of the primary server can be redirected to the NAS, which can then perform functions of the primary server until the primary server is restored. If the primary server is repaired, then at step 310 the updated image may be restored to the primary server.

If the diagnosis indicates that the failure is one that cannot be recovered from the NAS and the NAS is intact, the NAS backup image may be updated at step 311. The manner of the update can depend upon the result of the diagnosis. If the primary image is found to be corrupt, an embodiment of the present invention can determine about or exactly the time and/or update at which the image become corrupt. It would be undesirable to propagate to the backup image corrupt elements that are represented in one or more updates of the primary image. Therefore, the backup image can be updated to its state before it became corrupt on the primary server by only applying those updates at most up to the time of corruption. The updates may be applied only to a point well before the time of corruption, if desired. Indeed, the backup can be updated to any state from the time it was created to the time the last update is available in accordance with an embodiment of the present invention. At step 312 the updated image may be converted to a virtual server. The virtual server may then be activated at step 313. At step 314 users of the primary server may be redirected to the virtual server, which can perform the functions of the failed primary server until proper repairs or replacements can be made at the primary site. At step 315 delta images of the virtual server may be generated and stored on the NAS and remote storage device to maintain recovery capability until the primary server is restored.

If the diagnosis indicates a failure of both the primary server and the NAS, the remote backup image may be updated at step 316 as appropriate. At step 317 the updated image may be converted to a virtual server. The virtual server may then be activated at step 318. At step 319 users of the primary server may be redirected to the virtual server, which can perform the functions of the failed primary server until proper repairs or replacements can be made at the primary site. At step 320 delta images of the virtual server may be generated and stored on the remote storage device to maintain recovery capability until the primary server is restored.

Figure 4:
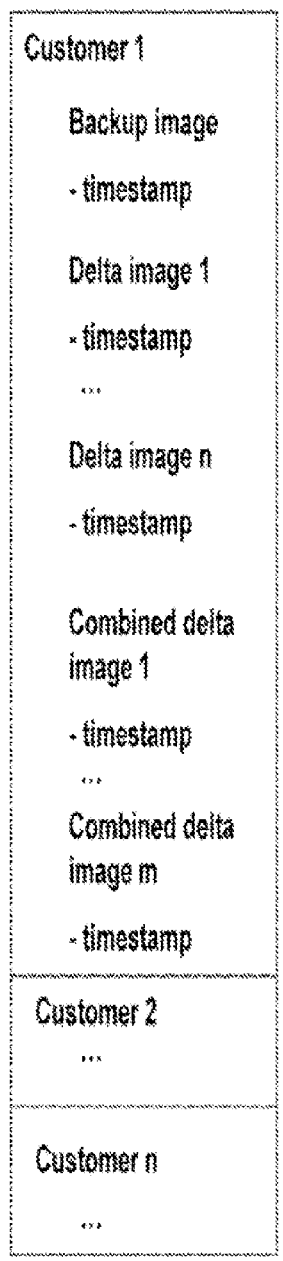
FIG. 4 illustrates a remote data storage system according to an embodiment of the present invention.

FIG. 4 shows a data structure that can be associated with a given backup image, including the backup image and several sequential delta images that reflect incremental changes to the backup image. The backup image can be stored with an index that represents the time at which the image was last updated with a delta image, the identifier of the last delta image that was applied to update the backup, etc. Likewise, each delta image can be associated with a time or an identifier that can be useful in ordering and tracking the implementation of the delta images. Multiple delta images may be periodically combined so that they correspond to an extended period of time, e.g., days, weeks, or months as described above.

In accordance with an embodiment of the present invention, a user can specify portions of a primary image which are or are not to be included in an initial backup image and/or in delta images for a given primary server. For example, a user (acting as an administrator for a primary server) may specify that certain data files, e.g., sensitive files or files which are not important to backup, not be included in the initial backup image or deltas. Thus, different backups can be maintained for a single primary server. The backups can be differentiated by user, by groups of users, by types of user, etc. When the primary server fails, a set of backup images can be restored, each, for example, to its own virtual backup server. When a user is redirected to the backup, the user interface module can direct the user to the appropriate backup server. For example, user interface module 205 or 206 (FIG. 2) can determine to which group a user belongs, which type a user is, the identity of a user, etc., and direct the user to the corresponding virtual server running the backup appropriate for that user. For example, a user can be identified by reading a cookie on the user machine, by receiving user logon credentials, a user type indication, a user group identifier, etc. User interface can use such information to lookup the appropriate virtual server in a table. For example, the lookup table can correlate a particular user with a particular backup image or virtual server, a particular user type with a virtual server, etc.

Figure 5:
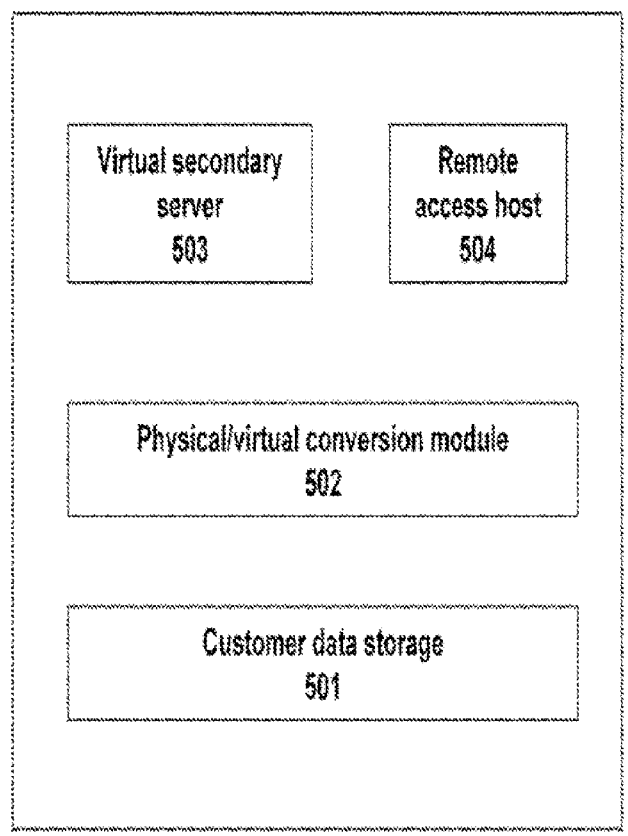
FIG. 5 illustrates a remote data system according to an embodiment of the present invention.

FIG. 5 illustrates a remote storage system according to an embodiment of the present invention. Customer data storage 501 may store multiple sets of primary images and delta images that may be associated with data recovery customers. Physical/Virtual conversion module 502 may perform physical-to-virtual conversions in response to a recovery failure, or virtual-to-physical conversions in response to a request to recover an image to the primary server. Virtual secondary server 503 can act as a replacement for one or more of the failed primary data servers associated with data recovery customers. Remote access host 504 can provide a secure access point for clients of failed primary data servers, who may remotely access the appropriate virtual secondary server 503.

As previously described, a remote server 103 or other similar backup system can perform the functionality of a primary server. In some embodiments, a backup system such as a remote storage server 103 can also generate backup images and/or delta images, such as when a primary system fails over to the backup system. For example, a primary system may be backed up to a remote system using any of the techniques previously described herein. The remote system may be activated and instructed or configured to operate in the stead of the primary system, such as where the remote system is a failover backup of the primary system. As another example, the remote system may operate as an exact duplicate of the primary system, although user access to the remote system may be limited, for example, due to licensing or other constraints.

While the backup system is operating as either a copy or a replacement of the primary system, it may generate backup and/or delta images as previously described with respect to the primary system. For example, the backup system may generate a primary image and/or delta images as described with respect to 301-306 in FIG. 3. More generally, the backup system may generate an image of the backup system, track changes to the backup system, and generate updates (periodically, aperiodically or in response to a triggering condition or event), as previously disclosed. The backup image may be updated based upon the contents of updates generated at the backup system. The image and/or any subsequent delta images may be sent to a third system, such as a second backup system or, if the primary system becomes functional or partly functional, the image of the backup system and any subsequent delta images may be sent to the primary system. In the event of a failure of the backup system, or in the event that it is desired to return functionality to a restored primary system, the up-to-date backup image can be loaded onto the third system or to the primary system, which when running can essentially duplicate a recent state of the backup system before the transfer. In an embodiment, the backup image and corresponding delta images can be used to activate a remote virtual server to which users can be redirected instead of the backup system and/or the primary system. In an embodiment, such a process may be used essentially to "swap" roles of a primary system and a backup system. In this embodiment, when operations are transferred to the backup system upon user instruction or a failure of the primary system, the backup system may begin operating in the stead of the primary system as previously described. It may then use the primary system as a backup system as previously described, possibly after the primary system is restored to a functional state.

Figure 6:
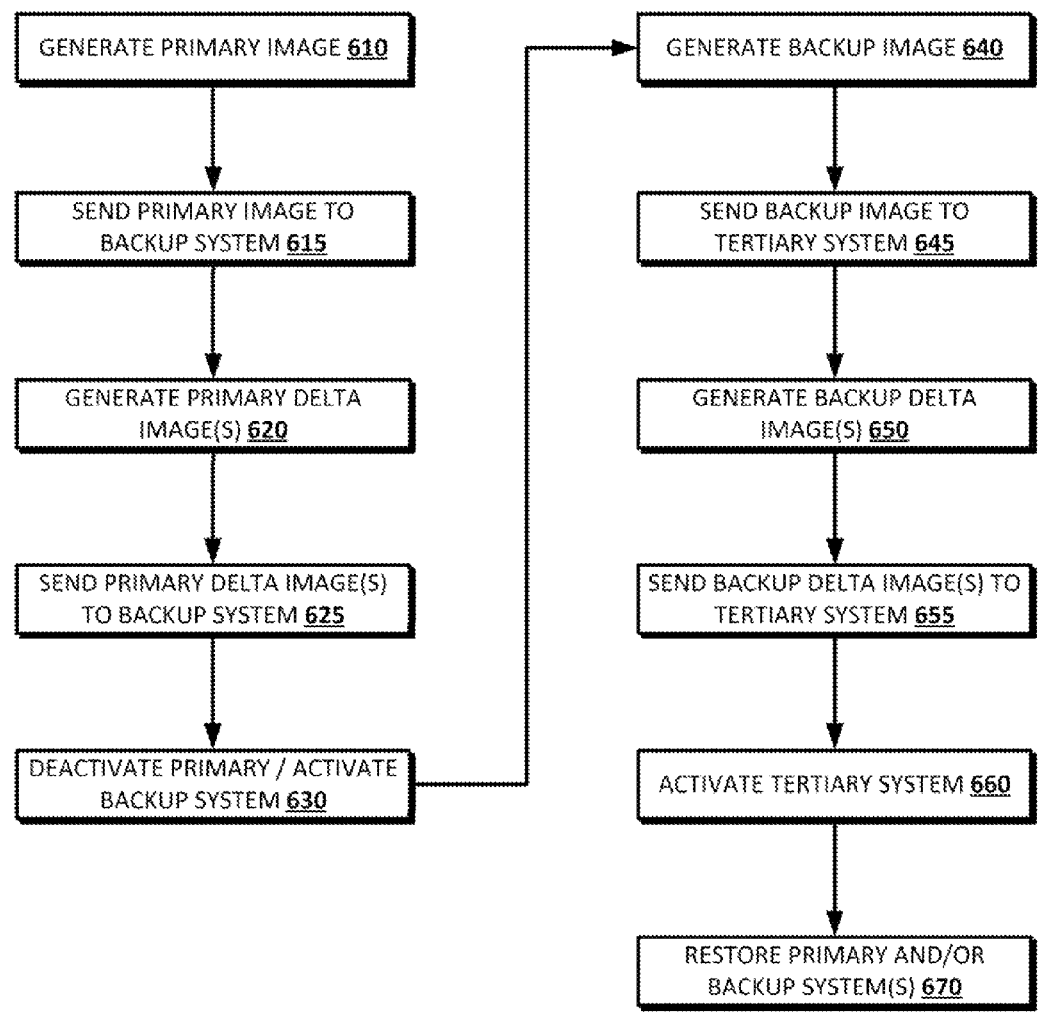
FIG. 6 shows an example process for operating a backup system according to an embodiment of the invention.
Figure 7:
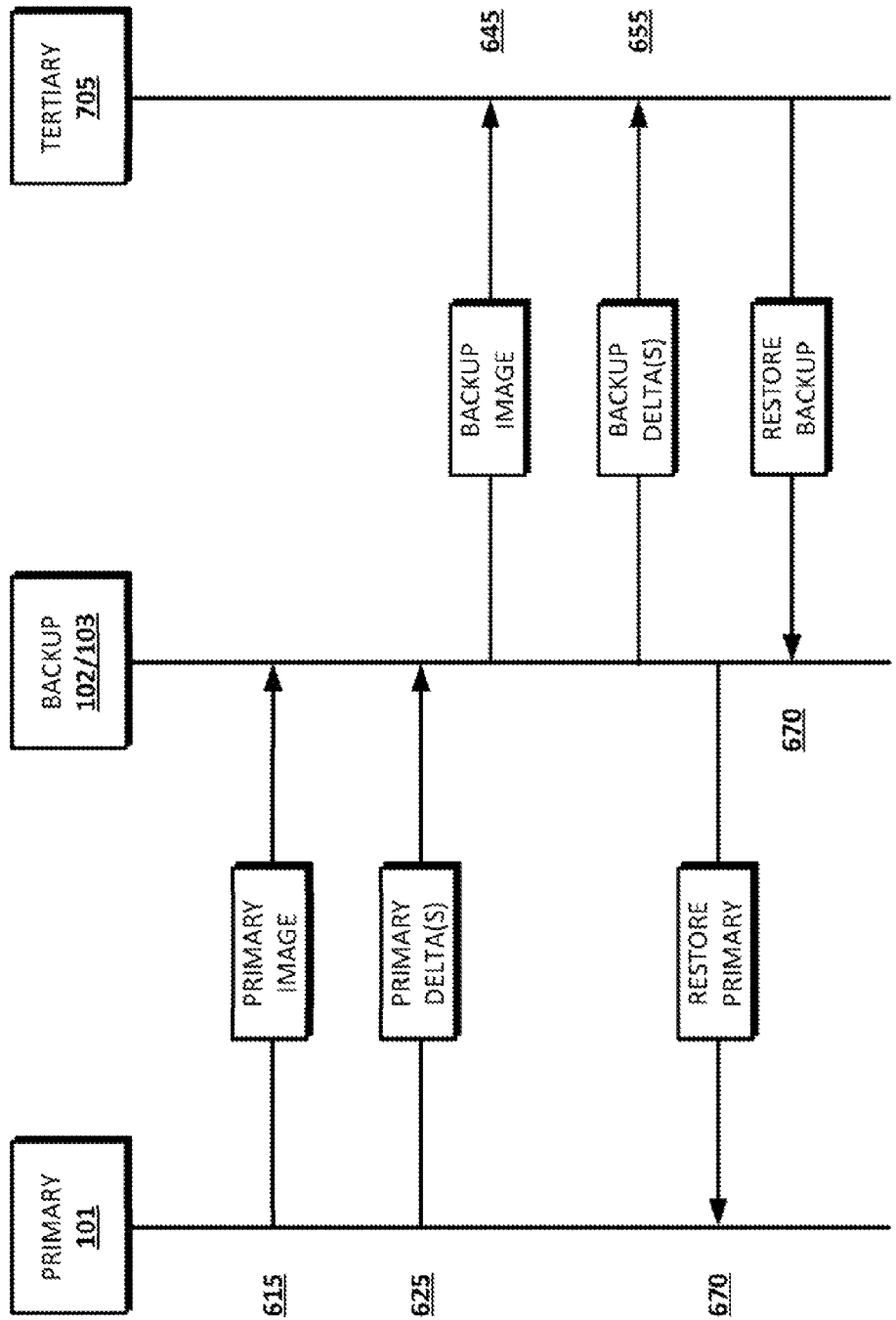
FIG. 7 shows an example data transfer in a backup system according to an embodiment of the invention.
Figure 8:
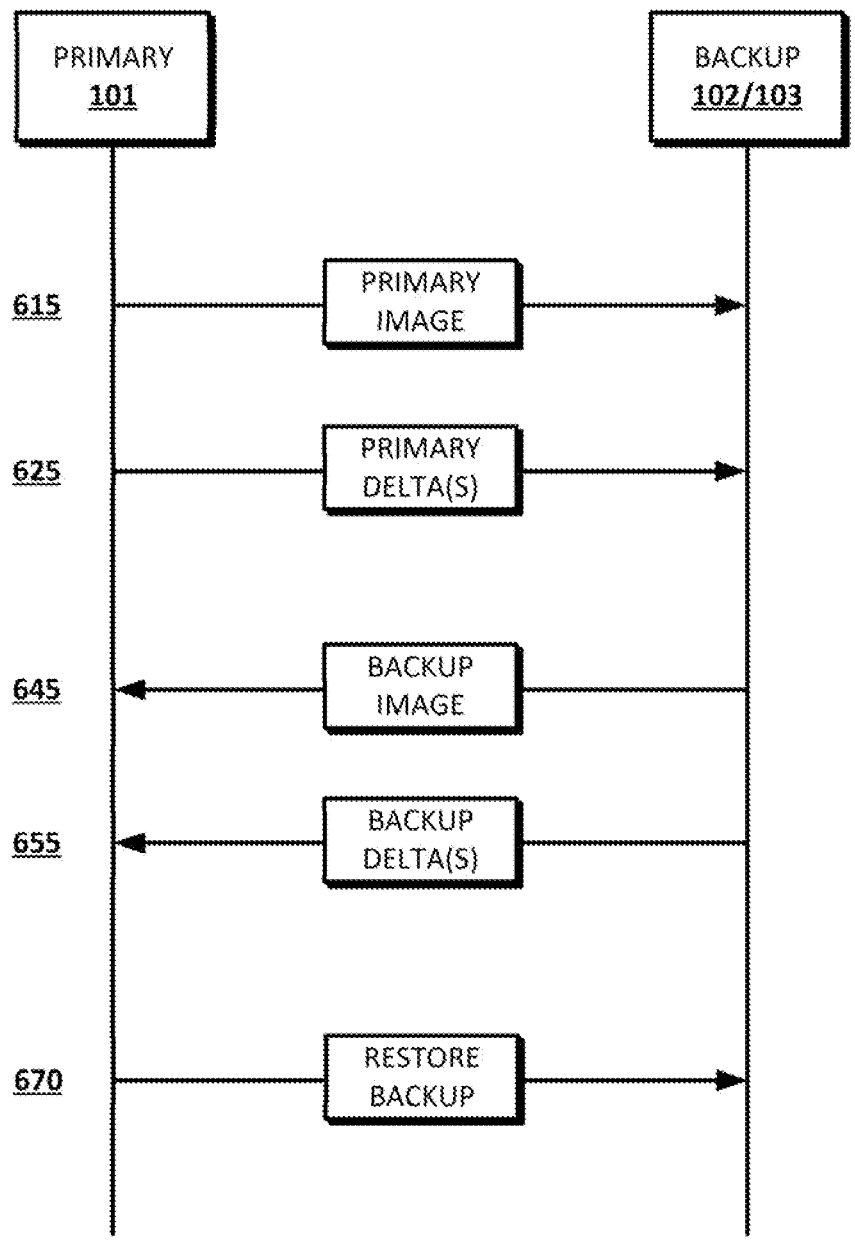
FIG. 8 shows an example data transfer in a backup system according to an embodiment of the invention.

FIG. 6 shows an example process according to an embodiment in which a backup system begins operating after a failure of the corresponding primary system and sends a backup to a third system, which may be the restored primary system. FIGS. 7 and 8 show example data transfers for embodiments of the process shown in FIG. 6. FIG. 7 shows an example in which a tertiary system 705 is used as a backup of one or more initial backup systems 102, 103. FIG. 8 shows an example in which the backup system 102/103 operates to send images and/or delta images that capture the state of the operational backup system to the primary system 101, such that the original primary system operates as described herein with respect to an original backup system, and the backup system operates as described herein with respect to an original primary system.

At 610, an image of the primary system may be generated, and sent to a backup system at 615 as previously described herein. The backup system may be local or remote relative to the primary system, and may be local or remote to users of the primary system as previously described. Similarly, delta images may be generated at 620 and sent to the backup system at 625. As previously described, the primary image and any primary delta images may provide an up-to-date copy of the primary system, which may be used to operate a virtual machine copy of the primary system, perform a virtual-to-physical conversion of the image to create a duplicate of the primary system, and the like.

At 630, the primary system may be deactivated, and/or the backup system may be activated. For example, the primary system may failover to the backup system as previously described. As another example, a user may decide to move operation from the primary system to the backup system for a reason other than a failure of the primary system. In an embodiment, the primary and backup systems may not operate as a primary system concurrently, or may operate concurrently, though in some cases for a relatively short amount of time. Such a configuration may be desirable, for example, to avoid incurring duplicate licensing fees for software installed on the replicated system, to avoid routing or access issues that could result from operating duplicate systems, and the like. The backup system may operate as a virtual server, as a physical server generated using a virtual-to-physical process as described herein, or a combination thereof.

Once the backup system is operational, it may begin generating backup images at 640 and/or delta images at 650. In some configurations, the backup image generated at 640 may be generated by creating a duplicate of the primary image created at 610. The image of the backup system and any subsequent delta images may be generated using any of the techniques disclosed herein. Because the backup system may be operating in the stead of the primary system or performing other functions, it may change state over time. By generating delta images, it may be possible to reconstruct the backup system at any given time, as has been previously described with respect to a primary system 101. The backup image and/or subsequent delta images may be sent to a tertiary system at 645 and 655, respectively. The tertiary system may be a further backup system, for example where the primary system has failed over to the backup system and is no longer available, and it is desired to maintain a further backup of the (now "primary") backup system. As another example, the tertiary system may be the primary system, such as where the primary system has been restored after a failure, and it is desired to have an up-to-date image of the operational backup system available at the primary system for a restore of the primary system. The tertiary system may operate as a virtual server, as a physical server generated using a virtual-to-physical process as described herein, or a combination thereof.

In an embodiment, the tertiary system may be activated at 660. For example, subsequent to a failure of the backup system 102/103, the tertiary system 705 may be activated and operations previously performed by the primary system 101, and/or the backup system 102/103 may be transferred to the tertiary system 705, such as where the tertiary system operates as a failover of the backup system. As previously described, the tertiary system may be or may be implemented by the original primary system, such as where the primary system stores up-to-date images of the operational backup system.

In an embodiment, the primary system and/or the backup system may be restored at 670, such as by using any of the techniques and arrangements described herein. For example, images stored at the tertiary system may be used to restore the primary system or the backup system to a state embodied in the images. That is, either the primary system or the backup system may be restored to a current state using a system image and/or delta images stored at the backup system or the tertiary system, using the same techniques disclosed herein in reference to restoring a primary system from a backup. More generally, systems described herein and illustrated with respect to FIGS. 6-8 may allow for various combinations of primary and backup operation. Where two backup systems are used, such as a backup system and a tertiary system as illustrated in FIGS. 6-8, any of the primary, backup, and tertiary systems may function as a primary, backup, or tertiary backup system as disclosed. For example, a primary system may send backup images and delta images to two backup systems as previously described. In the event that the primary system is deactivated, either of the two backup systems may operate as a primary system. Further, the operating backup system may send backup and delta images to the other backup system and/or the primary system, each of which may then operate as a backup system as disclosed herein. Further, in the event that the backup system operating as a primary system is deactivated, the second backup system or the primary system operating as a backup system may then operate as a primary system as disclosed. For example, the backup system may failover to either the other backup system or to the primary system operating as a backup system.

As previously described, a backup system as disclosed herein may operate on or as a virtual computer system, such as where a backup image and one or more delta images are used to create and run a virtual server. Similarly, a backup image, optionally with one or more delta images that may be integrated with the backup image, may be implemented as or on a virtual hard drive. Such a virtual hard drive may be implemented on, and/or accessed, by a physical system, a virtual system or any combination thereof. For example, in a cloud-based or other hosted environment, a single physical or virtual system may include multiple virtual hard drives for disparate remote systems for which the single physical or virtual system is providing backup services. Similarly, the single physical or virtual system may provide backup services by maintaining images of entire physical or virtual systems for which it is providing backup services. Unless indicated otherwise herein, where possible the same backup and restore procedures disclosed with respect to a virtual system may apply to a virtual hard drive, and vice-versa. Thus, more generally, backup and restore procedures and systems disclosed herein may apply equally to virtual and physical systems and/or hard drives.

Figure 9:
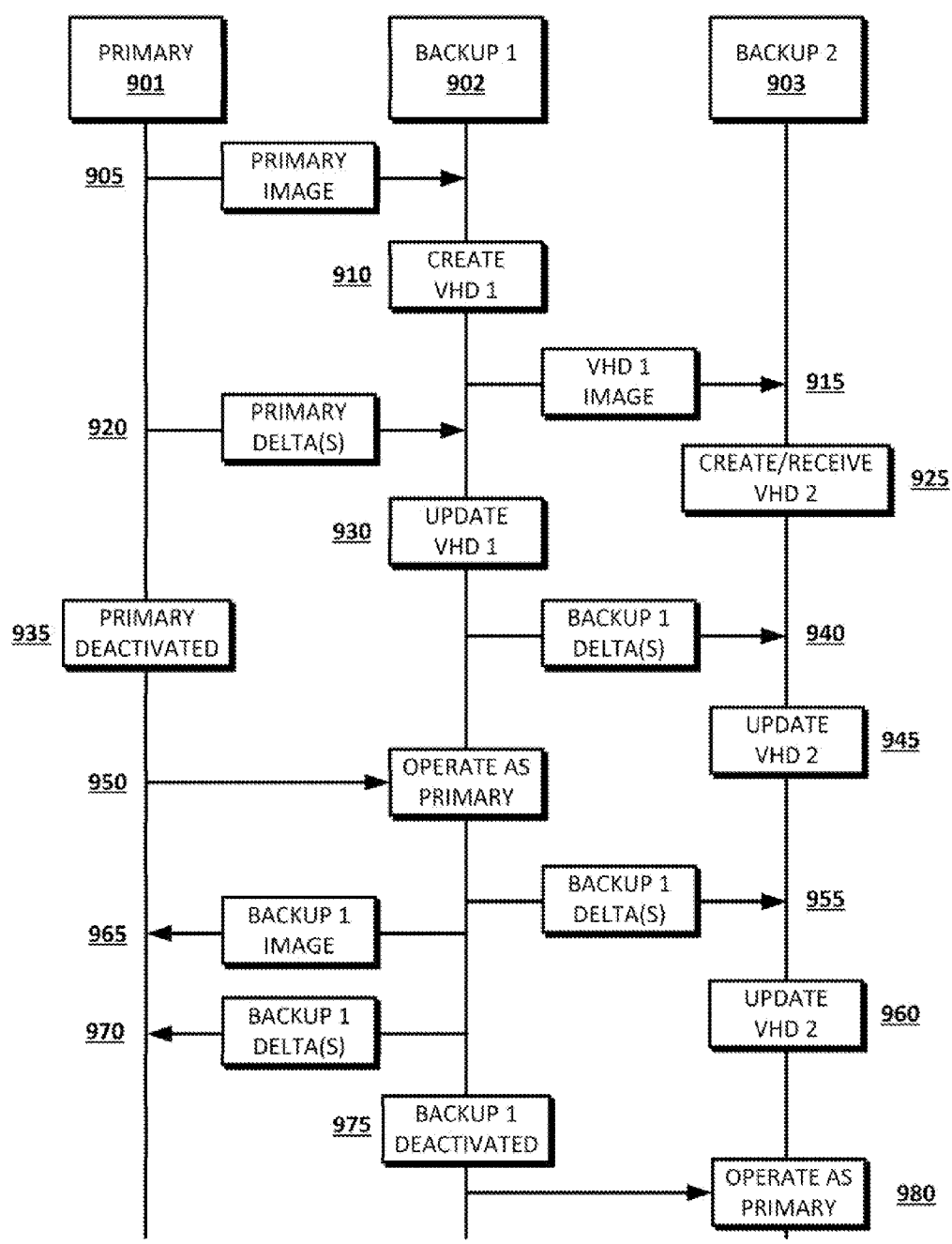
FIG. 9 shows an example data transfer in a system according to an embodiment of the invention.

FIG. 9 shows a system arrangement and associated processes that illustrate examples of the backup and restore arrangements disclosed herein. The illustrated arrangement includes three systems, a primary system 901, a first backup system 902, and a second backup system 903. The primary system may be a primary system 101 as previously disclosed. Each backup system 902, 903 may be a backup system 102, 103 as previously disclosed. Further, it will be apparent that each system may perform the functions previously described with respect to any of the primary and/or backup systems 101, 102, 103, depending upon whether the primary or backup system is operating as a primary system or a backup system.

At 905, a primary image of the primary system 901 may be created on, or created and transmitted to, the first backup system 902. The image may include, or may be used to create, a virtual hard drive at 910 as previously disclosed. For example, a base image of the primary system 901 may be used to generate a virtual hard drive that includes or operates as an exact replica of one or more hard drives at the primary system 901. Similarly, one or more delta images may be provided to the backup system at 920 as previously disclosed. Multiple delta images may be provided during operation of the primary system 901 as previously disclosed, such that the virtual hard drive is updated at 930 to provide an up-to-date version of the primary system 901 at the backup system 902. For example, the virtual hard drive created at 910 and updated with any subsequent delta images at 930 may represent a virtual copy of the current state of a hard drive at the primary system 901.

At 915, the virtual hard drive at the backup system 902 may be duplicated to the second backup system 903, and updated with any incremental delta images at 940. The initial image and delta images may be exact duplicates of those received at the backup system 902 from the primary system 901, or they may be separately-created images resulting from operation of the virtual hard drive or similar system at the backup system 902 as previously described. Thus, in some configurations, a virtual hard drive may be created at 925 and updated at 945 using images received from the backup system 902. Alternatively or in addition, the virtual hard drive may be received at 925, such as where the virtual hard drive is a replica of the virtual hard drive created at 910. In other configurations, the creation and update steps may be omitted since the second backup system 903 may receive an up-to-date copy of the virtual hard drive created at the first backup system 902. In other configurations, the complete initial virtual hard drive may be transmitted from the first backup system 902 to the second backup system 903 at 915, and updated at the second backup system 903 using incremental delta images received from the first backup system 902 at 940.

At 935, the primary system 901 may be deactivated. The deactivation may occur due to a failure of the primary system or based upon an instruction to deactivate the primary system. For example, a user may wish to perform physical maintenance on a physical computing system that hosts the system for which backup services are provided by the backup systems 902, 903, and thus may instruct the backup system 902 to assume the operations and functionality that otherwise would be provided by the primary system 901. At 950, the backup system 902 may begin operating in the stead of the primary system 901. For example, the backup system may provide functionality previously provided by the primary system 901, and user requests that otherwise would be received by the primary system 901 may be received and processed by the backup system 902.

At 955, delta images of the backup system 902, which is operating as a primary system, may be provided to the second backup system 903. For example, delta images that capture changes made to the virtual hard drive provided at 915 subsequent to the first backup system 902 assuming operation from the primary system 901 may be provided to the second backup system 903. The delta images then may be used to update the virtual hard drive at the second backup system at 960 and/or update a virtual or physical hard drive at the primary system 902.

Separately from the updates being provided to the second backup system at 955, the first backup system 902 also may provide an initial image, such as a virtual hard drive, to the primary system and/or to another system at 965, and/or associated delta images at 970. For example, if the primary system 901 has been reactivated, the backup system 902 may provide one or more images sufficient to restore the original primary system 901 to the same state as the backup system 902 which is operating as a primary system, such as a base image, one or more delta images, or a combination thereof. For example, if the primary system was deactivated for a period of time, but retains some portion of its original data, a number of delta images may be provided to synchronize the primary system with the backup system 902 operating as a primary system. In other cases, such as a catastrophic failure of the original primary system in which all data in the system was lost, an initial base image, optionally with one or more delta images, may be provided to the primary system when it is reactivated. As another example, if the physical system hosting the primary system is damaged or otherwise not available, a comparable system may receive the appropriate images from the backup system 902 to begin operating as a primary system.

Similarly to the processes described after deactivation of the primary system at 935, the first backup system may be deactivated at 975, after which the second backup system 903, the primary system 901, or another system that has received appropriate images may begin operating as the primary system at 980. The processes described with respect to backup, restore, and assumption of functionality may be repeated for any number of systems, thus providing an "always on" backup for the primary system, regardless of the operational state of the primary system and/or one or more backup systems.

The incremental images taken at various points as described with respect to FIG. 9 and elsewhere herein may be taken at any time or frequency, allowing for nearly-instant or instant backup and restoration of a system. For example, an incremental image may be created each time there is a change to an existing system, each time one or more changes are made that, in total, cause changes to a threshold amount of data stored on the existing system, or the like. Thus, a system may be restored to any point in time of its previous operation. This may be advantageous because it allows for immediate and complete restoration of a system. Similarly, it also may allow for recovery from non-fatal disruptions to a system. For example, if a primary system is determined to be infected with a virus or other malicious software, the primary system and/or a backup of the primary system may be restored to a point previous to the time when the malicious software became present on the system. Similarly, a backup image may be "rolled back" separately from the primary system and/or any other backup images, by applying or removing the appropriate delta images to a base image.

In an embodiment, the techniques disclosed herein may be used to transition a system to another location or hosting arrangement, such as to transfer a production system to a cloud-based service. FIGS. 10 and 11 show a specific example of such a system and technique. A primary system 101 may have an associated local backup system 102 or remote backup system 103 as previously described. The various systems may communicate via a communication network 1002 such as the Internet. To migrate the primary system, a base image of the primary system may be provided to a cloud-based service 1001 at 1010, as well as any delta images needed for the image at the cloud-based service to be up-to-date with the primary system. At 1020, the primary system may be deactivated and the cloud-based image activated at 1030, so as to operate as the primary system. At 1040, the cloud-based system 1001 may then provide incremental delta images to a preexisting backup system 102 or 103.

If the cloud-based system 1001 is deactivated or otherwise becomes unavailable to a user, a monitoring system, or the like, operation of the primary system running at the cloud-based system may failover to a backup system 102, 103 as previously described, at 1050. Thus, the arrangement and techniques disclosed with respect to FIGS. 10 and 11 may be useful, for example, when a user wishes to migrate an existing production system to a cloud-based service or similar hosted arrangement, while still maintaining a local backup of the production system. For example, the user may wish to maintain a local backup of the cloud-based system to guard against disruptions caused if the cloud-based system should become unavailable.

Although some embodiments and examples provided herein are described with respect to a base image and delta images that are provided from a first system to a second, it will be understood that in some configurations delta images may be applied to a base system prior to providing the updated base image to the second system. Thus, an image of a system as disclosed herein may be an original base image, or it may be an image with one or more delta images already incorporated therein.

Other than explicitly indicated, the various steps disclosed herein may be omitted or may be performed in an order other than the example order(s) illustrated. In addition, other arrangements and data transfers between the primary, backup, and tertiary systems may be used. For example, referring to FIG. 7, a backup system may be restored prior to restoring a primary system, or only one system may be restored. As another example, a backup image and/or backup delta images at a tertiary system may be used to restore a primary system directly, or the tertiary system may operate directly as a failover for the primary system. As another example, the images provided between various systems in FIG. 9, such as at 905 and 920, 915 and 940, and the like, may be performed in a different order relative to the various other operations described. As a specific example, the first backup system 902 may receive an initial image at 905 and delta images at 920 prior to creating a virtual hard drive at 910, and/or prior to various images being provided to the second backup system at 915 and 940. Further, other than explicitly indicated, a backup system as disclosed herein may be implemented on a local system, i.e., a system integrated with or otherwise physically local to the system for which it is serving as a backup, a local network system such as a LAN, or a remote system such as a physically or geographically remote system, a hosted system such as a cloud-based system, or the like.

The failover processes to restore operation can be accomplished in minutes versus the possible days of time involved in traditional tape reloads, off site data storage. Several businesses may cooperatively use a single server with large data storage and with multiple virtual machines available for use as backup servers when failures occur. This can reduce the cost of near real time backups that are often prohibitively expensive for small companies and individuals by allowing utilization of only one license for the operating systems and program applications because only a single instance of the server (and thus the licensed software) is operational at any point in time. Furthermore, the invention can provide for a means to restore operations to new primary server hardware in the event of a catastrophic failure that can be hardware independent and allow fast, seamless installation and business continuity.

Although described with respect to a failure of a primary system, the techniques and arrangements disclosed herein also may be used when a user desires operation to be moved from a primary system to a backup system for reasons other than a failure of the primary system. For example, a user may desire to perform physical maintenance on the primary system, during which it may be more convenient to move operation to the backup system rather than attempt to maintain the primary system in an operational state. More generally, the techniques and arrangements described herein may be used in any situation where it is desired or necessary to move operations and user access from a primary system to a backup system and/or from the backup system back to the primary system.

While various embodiments of the present invention have been described above, it should be understood that they have been presented by way of example and not limitation. It will be apparent to one skilled in the pertinent art that various changes in form and detail can be made therein without departing from the spirit and scope of the invention.

The invention claimed is:

1. A method comprising:
   receiving a first image of a first computer system at a cloud-based second computer system;
   receiving a first plurality of delta images at the cloud-based second computer system, each delta image of the first plurality of delta images representing an incremental change in the first computer system;
   operating the second computer system as a primary version of the first computer system, based upon the first image and the first plurality of delta images;
   generating a second image of the cloud-based second computer system;
   providing the second image to a third computer system, the third computer system being local to users of the first computer system; and
   providing a second plurality of delta images to the third computer system, each delta image of the second plurality of delta images representing an incremental change in a state of the cloud-based second computer system.

2. A method as recited in claim 1, further comprising a step of deactivating the first computer system subsequent to receiving the first image and the first plurality of delta images.

3. A method as recited in claim 1, further comprising operating the third computer system as a backup of the cloud-based second computer system.

4. A method as recited in claim 1, wherein the second image is a replica of the first image.

5. A method as recited in claim 1, wherein the first image comprises a virtual hard drive.

6. A method as recited in claim 1, further comprising:
   determining that the cloud-based second computer system is unavailable for use as a primary version of the first computer system; and
   operating the third computer system as a primary version of the first computer system.

* * * * *